G. BAROT.
FLEXIBLE TABLE FOR CURVING GLASS.
APPLICATION FILED JAN. 5, 1914.

1,107,476.

Patented Aug. 18, 1914.

2 SHEETS—SHEET 1.

G. BAROT.
FLEXIBLE TABLE FOR CURVING GLASS.
APPLICATION FILED JAN. 5, 1914.

1,107,476.

Patented Aug. 18, 1914.

2 SHEETS—SHEET 2.

Witnesses:
C. D. Swett.
M. A. Bond.

Inventor:
Georges Barot
by F. Ditmar
Attorney.

UNITED STATES PATENT OFFICE.

GEORGES BAROT, OF CHAUNY, FRANCE.

FLEXIBLE TABLE FOR CURVING GLASS.

1,107,476.  Specification of Letters Patent.  Patented Aug. 18, 1914.

Application filed January 5, 1914. Serial No. 810,381.

*To all whom it may concern:*

Be it known that I, GEORGES BAROT, a citizen of the Republic of France, residing at Chauny, Aisne, France, have invented certain new and useful Improvements in Flexible Tables for Curving Glass, of which the following is a specification, reference being had therein to the accompanying drawing.

This invention relates to glass working, and its objects are to simplify the bulging or curving of sheet glass and to reduce the cost of treating plate glass.

A chain of special construction is employed in connection with other elements to form an easily adjusted and operated forming table; which, on its part, readily conforms to the curve of the mold employed.

The accompanying drawing fully illustrates the invention, its various features being referred to by letters, similar letters denoting corresponding parts in the several views.

Figure 1:
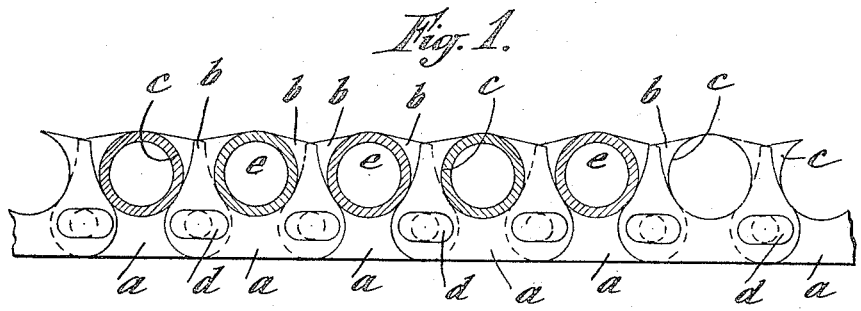
Figure 2:
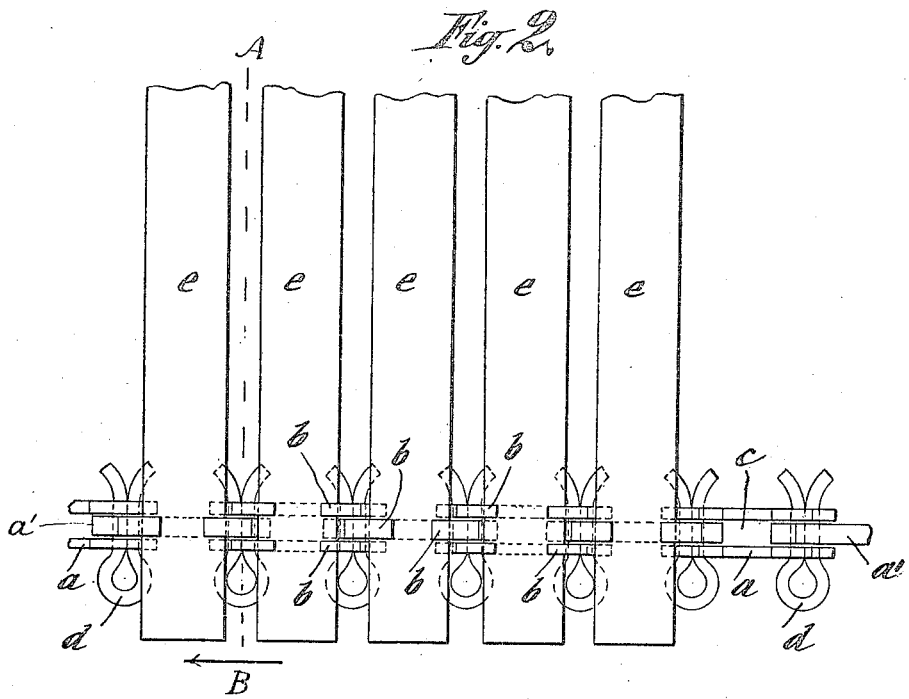
Figure 3:
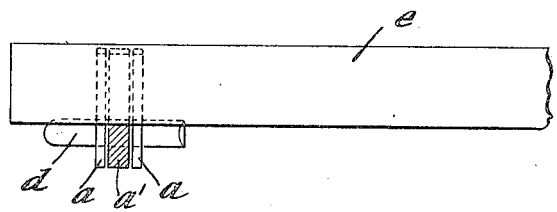
Figure 4:
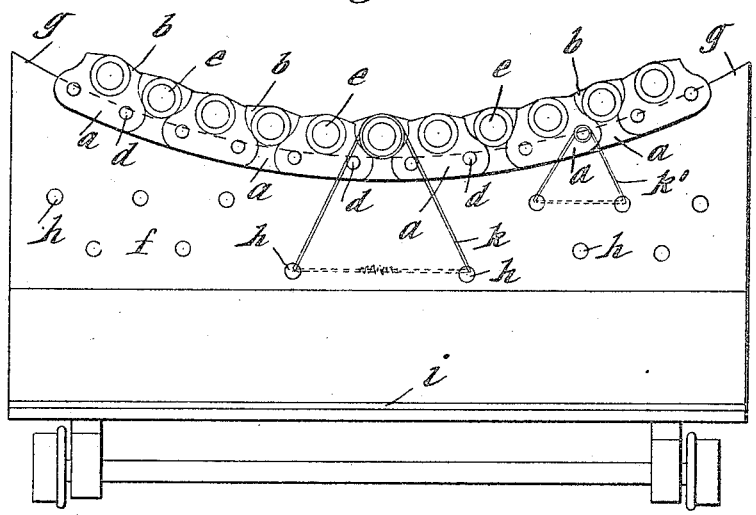
Figure 5:
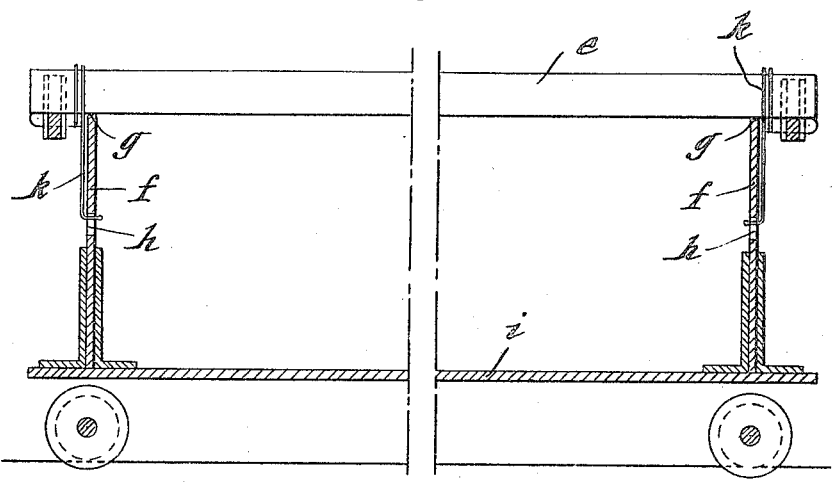

In the drawing Figure 1, shows a side elevation of the chain preferably employed. Fig. 2, is a plan view of the parts shown in Fig. 1. Fig. 3 is a detail partly in section on the line A—B, of Fig. 2. Fig. 4 is a side elevation of the device mounted on a mold, which is supported on a truck, and Fig. 5 is a fragmentary end elevation, partly in section, of the device as secured to the mold.

The letter $a$ designates the outer links of a chain which overlap, and are joined together by, the inner link $a'$. These links are preferably made from sheet metal and are connected together by spring pivots $d$ and are provided with a rounded projection $b$, on each end. Relatively large transverse openings $c$, are provided in the outer links $a$, and these openings form bearings for tubes or rollers $e$, which, when in operative position, constitute the forming table. These openings $c$ should be slightly larger in diameter than the tubes $e$, to permit the ends of the latter to be easily adjusted in said openings. The outer links of the chain are tapered toward the top to allow the links to approach each other without touching the tubes when the table is required to hold a concave mold. The pivots $d$ holding the links of the chain together are adapted to be easily removed to permit of rapid mounting and dismounting of the device, when it is desired to increase or reduce the surface of the table.

In assembling the parts of this invention the operator takes the number of links required for the surface it is desired to obtain and slides the tubes into the openings provided in the chain. The table thus formed is placed on the mold $f$, whose upper part $g$, has the curve desired. The tubes are placed on this curve as indicated in Fig. 4.

It is well understood that in making this device and the mold, it is necessary to take into account the thickness of the tubes and of the asbestos used. Holes $h$ are provided in the body of the mold into which there is passed a wire $k$ that winds up, either on the end of a tube or on any part of the chain, at one or more places, so as to hold the table in place. The molds $f$ are mounted on a truck $i$, as has heretofore been done. The table may remain in form indefinitely, but may be elongated or reduced by the use of longer or shorter tubes, according to the size of the glass to be treated. By this construction I dispense with the formation of notches in the molds as has been done formerly and better results have been secured in all respects. The chain may be composed of links of twisted wire or other suitable material, instead of the links punched from sheet metal, shown in the drawings.

What I claim and dseire to secure, is—

A flexible table for curving glass, comprising a plurality of links struck from sheet metal and provided with transverse openings, tubes having bearings in said openings and extending across the mold, spring pins securing together said links and a wire binder passed over the ends of said tubes and through openings in the mold, to retain said tubes in operative position on the mold.

In testimony whereof I affix my signature in the presence of two witnesses.

GEORGES BAROT.

Witnesses:
HANSON C. COXE,
EDWARD W. BUEIL.